United States Patent [19]
Martin et al.

[11] Patent Number: 5,656,208
[45] Date of Patent: Aug. 12, 1997

[54] METHOD AND APPARATUS FOR CONTACT LENS MOLD FILLING AND ASSEMBLY

[75] Inventors: Wallace Anthony Martin, Orange Park; Jonathan Patrick Adams, Jacksonville, both of Fla.; Finn Thrige Andersen, Vedbaek; Ture Kindt-Larsen, Holte, both of Denmark; Jeffrey Eldon Steven, Jacksonville, Fla.; Craig William Walker, Jacksonville, Fla.; Daniel Tsu-Fang Wang, Jacksonville, Fla.; Michael Francis Widman, Jacksonville, Fla.

[73] Assignee: Johnson & Johnson Vision Products, Inc., Jacksonville, Fla.

[21] Appl. No.: 258,264

[22] Filed: Jun. 10, 1994

[51] Int. Cl.$^6$ ............................................. B29D 11/00
[52] U.S. Cl. ........................... 264/1.1; 264/102; 425/73; 425/90; 425/347; 425/808
[58] Field of Search ................... 264/1.1, 1.36, 264/1.38, 1.7, 334, 101, 102; 425/174.4, 808, 73, 90, 345, 347, 348 R

[56] References Cited

U.S. PATENT DOCUMENTS

| | | |
|---|---|---|
| 2,542,386 | 2/1951 | Beattie ........................ 425/808 |
| 4,054,624 | 10/1977 | LeBouef et al. ............... 264/102 |
| 4,495,313 | 1/1985 | Larsen . |
| 4,565,348 | 1/1986 | Larsen . |
| 4,640,489 | 2/1987 | Larsen . |
| 4,680,336 | 7/1987 | Larsen et al. . |
| 4,691,820 | 9/1987 | Martinez . |
| 4,786,444 | 11/1988 | Hwang ........................ 425/808 |
| 4,889,664 | 12/1989 | Kindt-Larsen et al. . |
| 5,039,459 | 8/1991 | Kindt-Larsen et al. . |
| 5,080,839 | 1/1992 | Kindt-Larsen . |
| 5,094,609 | 3/1992 | Kindt-Larsen . |
| 5,164,228 | 11/1992 | Peralta et al. ................ 264/1.7 |
| 5,417,557 | 5/1995 | Ross et al. ................... 425/174.4 |
| 5,435,943 | 7/1995 | Adams et al. ................. 425/808 |

*Primary Examiner*—Mathieu D. Vargot

[57] ABSTRACT

An apparatus for filling and assembling mold parts for a contact lens includes a first automated station for receiving a plurality of front curve contact lens mold parts and depositing in each front curve mold a predetermined amount of a polymerizable monomer or monomer mixture, and, a second automated station for receiving the plurality of front curve mold parts and assembling each front curve mold part with a back curve mold part under vacuum to prevent entrapment of gas between the mold parts. The front curve mold parts are transported to the first and to the second automated stations by a pallet having registration guides that cooperate with the second station to register the pallet prior to assembly of the mold parts.

43 Claims, 10 Drawing Sheets

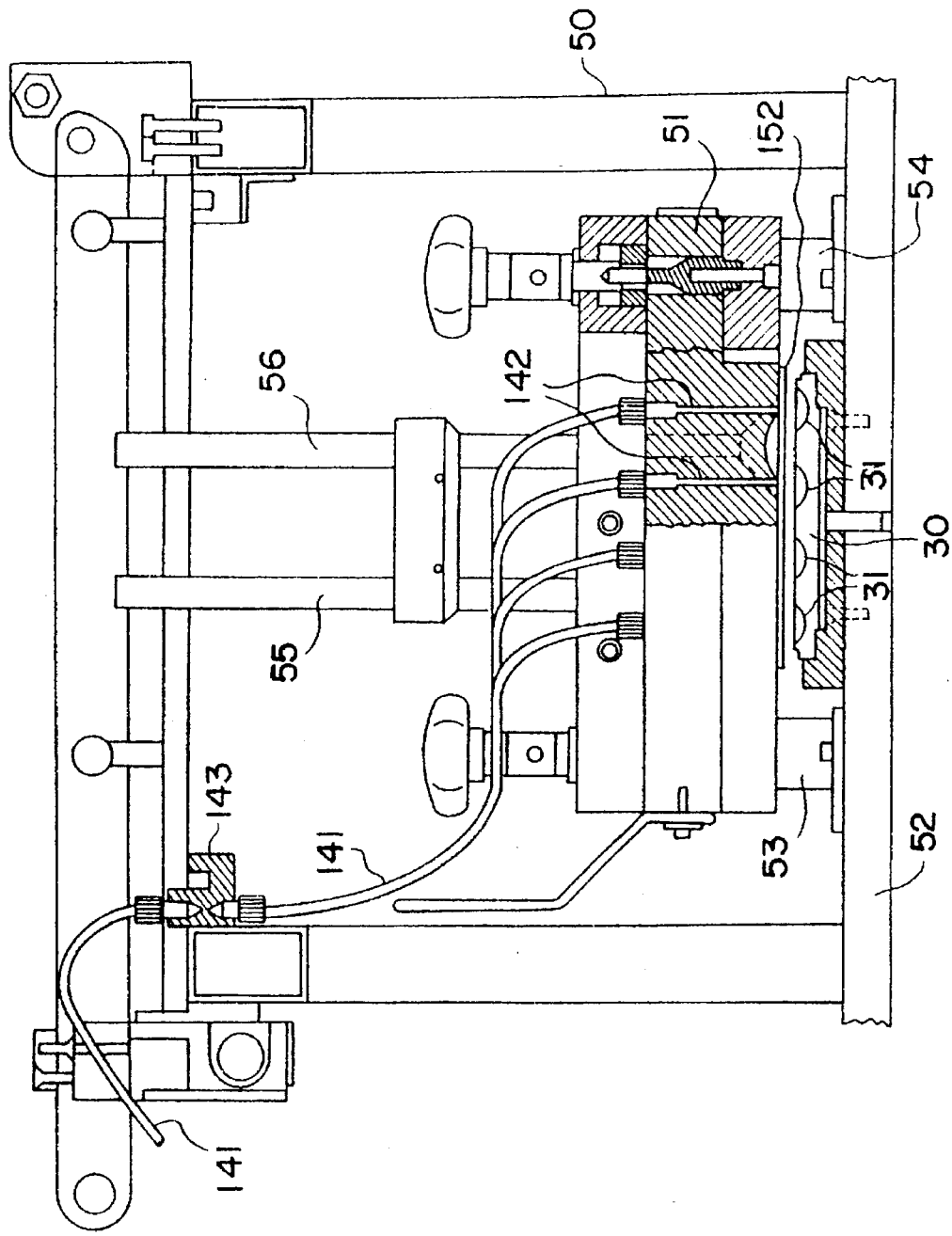

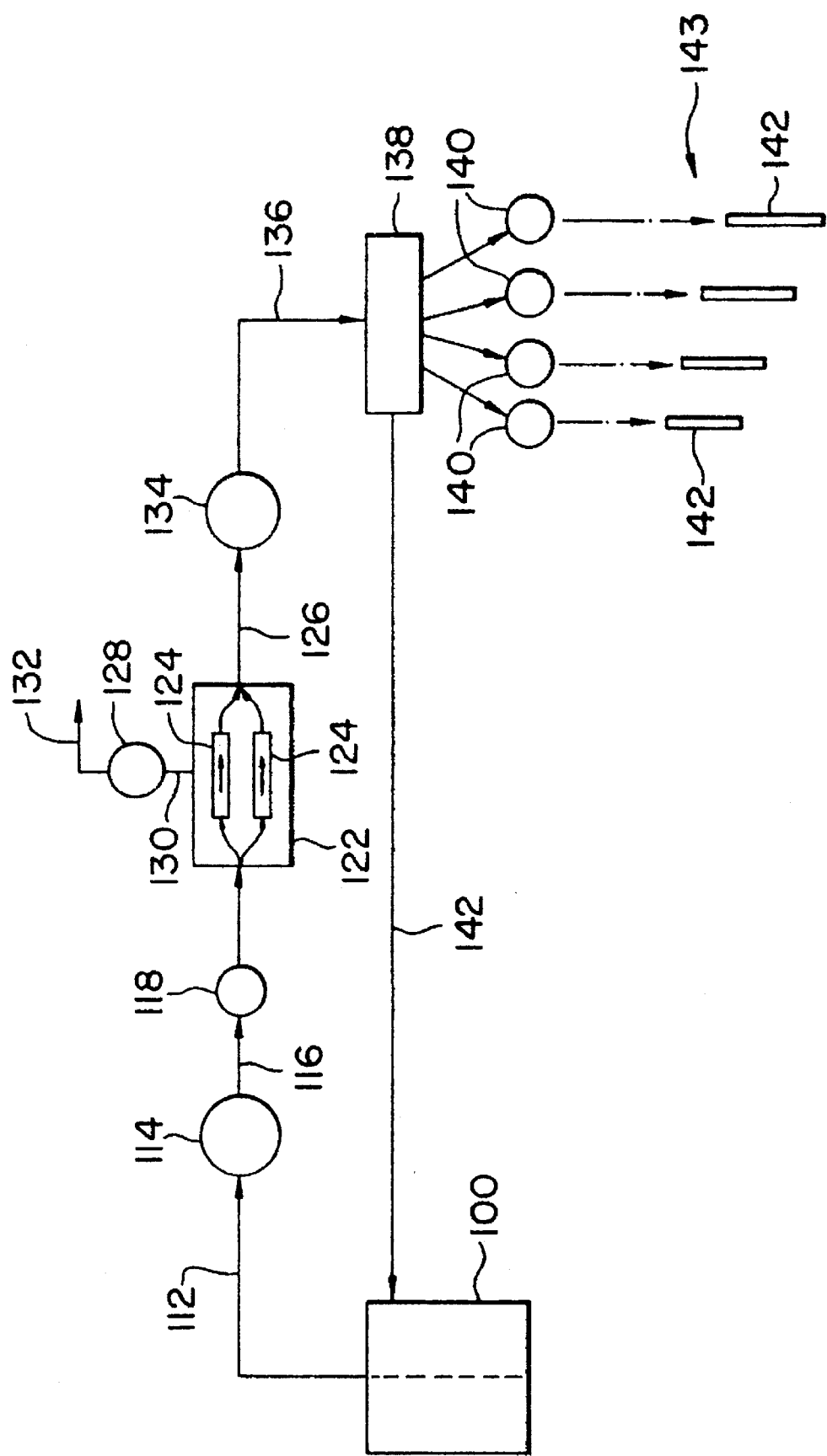

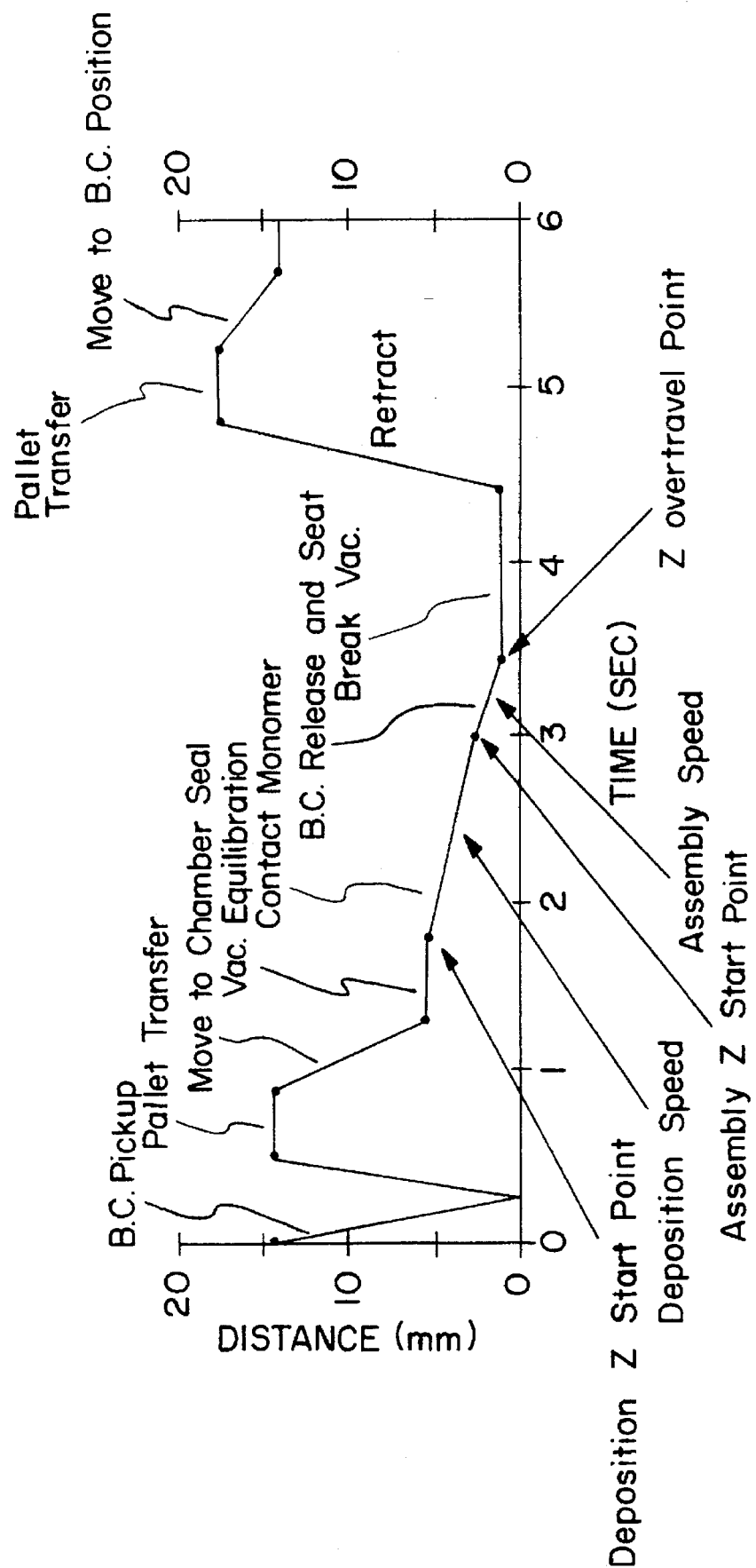

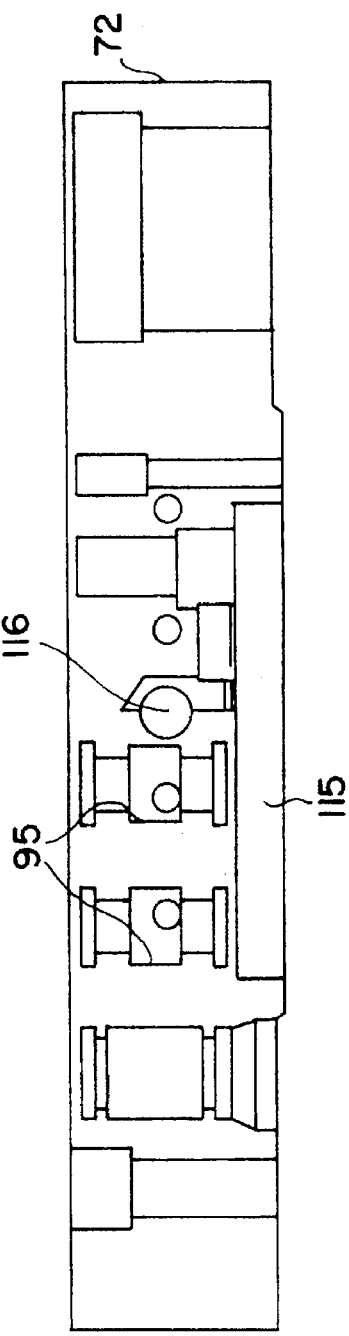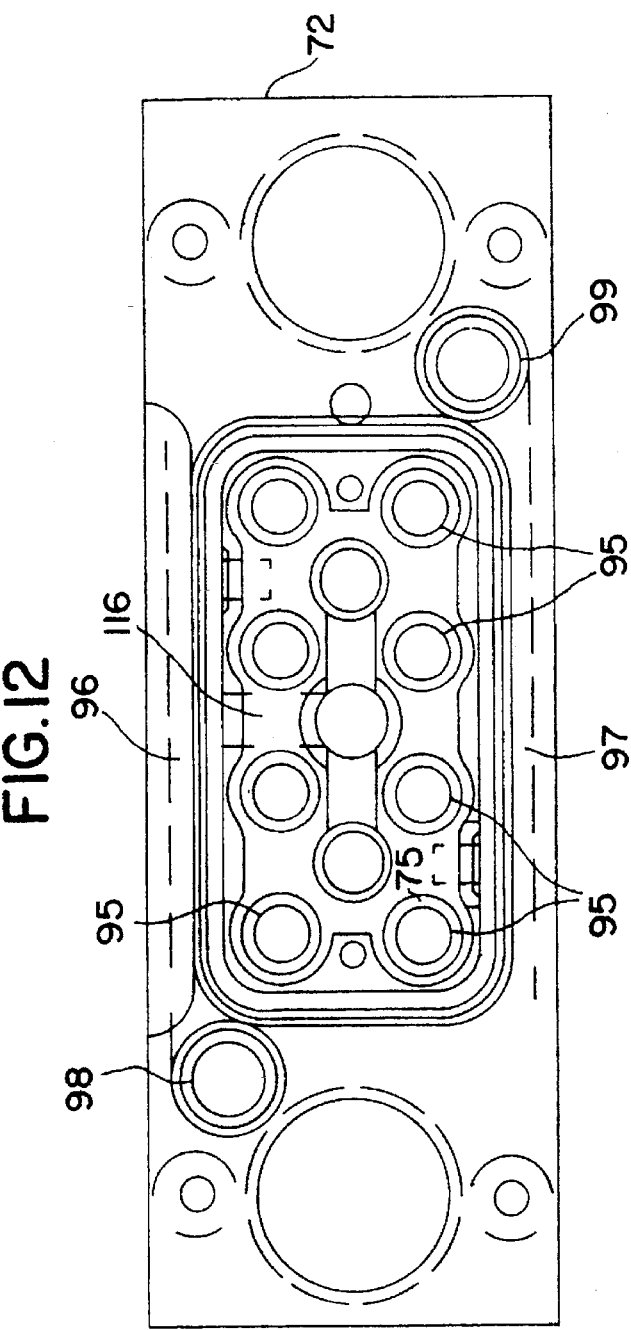

METHOD AND APPARATUS FOR CONTACT LENS MOLD FILLING AND ASSEMBLY

BACKGROUND OF THE INVENTION

1. Field of the Invention

The present invention relates generally to an apparatus and method for filling and assembling molds used in the production of contact lenses, and more particularly, for filling and assembling a mold having a polymerizable hydrogel therein, under vacuum, to form a soft contact lens.

2. Discussion of the Prior Art

U.S. Pat. No. 4,564,348 to Larsen, now assigned to the assignee of the present invention, discloses plastic molds for manufacturing a plurality of soft contact lenses in a continuous or semicontinuous method of operation. A mold assembly having a plurality of mold units is filled with a polymerization mixture in a first dosing step, and the mold units are then covered with a convex mold member or lid as shown in FIG. 5, and the lids are brought to rest on the concave mold members properly aligned and without distortion. The lids are free to float and align themselves on the pool of polymerizable mixture held in the concave mold.

U.S. Pat. No. 4,640,489, also to Larsen, now assigned to the assignee of the present application, discloses a mold for making contact lenses wherein one of the two mold sections is relatively more flexible than the other. In addition, a number of mold constructions known to the prior art are discussed in the background portion of the specification of this patent.

U.S. Pat. No. 4,495,313, also to Larsen, and now assigned to the assignee of the present application, discloses a mold assembly in which shrinkage of the monomer mixture during polymerization creates a negative pressure which aligns the upper mold half and draws excess monomer into the cavity.

In the commercial application of the invention described in U.S. Pat. No. 4,640,489 it has been found advantageous to weight the upper male portion of the mold cavity with a fixed weight subsequent to assembly to seat the upper male mold half and to displace any excess monomer in the mold cavity into a space between the flanges, as illustrated in FIG. 1 of that patent, to form a HEMA ring which is preferentially adhered to the upper or male portion of the mold cavity by a corona discharge treatment of a portion of the male mold.

SUMMARY OF THE INVENTION

The present invention is an apparatus and a method for filling and assembling contact lens molds with a polymerizable monomer or monomer mixture to form a soft contact lens. More particularly, a method and apparatus is disclosed for filling a contact lens mold with a polymerizable monomer or monomer mixture, and then assembling the mold parts under vacuum with a predetermined preload to insure the air or other gases are not trapped in the mold cavity with the monomer or monomer mixture.

It is an object of the present invention to provide an apparatus for filling and assembling mold parts for a contact lens which includes a first automated station for receiving a plurality of front curve contact lens mold parts, carried in a unique carrier, which are then filled with a predetermined amount of polymerizable monomer or monomer mixture. The apparatus also includes a second automated station which provides a coating of surfactant on a portion of the front curve lens mold part to provide for preferential adhesion of any excess monomer or monomer mixture to a back curve mold part. The apparatus further includes a third automated station for sequentially receiving a plurality of back curve mold parts, carried by a unique carrier, removing the back curve mold parts from the carrier, and then receiving and registering the plurality of front curve mold parts which were previously filled with the polymerizable monomer or monomer mixture. A vacuum is first drawn about the mold parts, and then the back curve is assembled with the front curve to displace excess monomer or monomer mixture from the mold cavity. The assembly is accomplished under vacuum to speed the assembly of the mold and to avoid the formation of gas bubbles from any gasses that might otherwise be trapped between the mold parts at the time of mold assembly.

It is a further object of the present invention to provide for the assembly of a plurality of front curve mold parts in a single assembly step wherein each of the mold parts are separately and independently biased from a common air plenum to provide independent reciprocation with respect to each mold part while clamping each back curve to its associated front curve with a common predetermined pressure.

It is further an object of the present invention to provide for dosing of a degassed monomer or monomer mixture in the front mold cavity wherein said dosing is carried out under vacuum or low atmospheric pressure conditions to thereby prevent the entrapment of gas under the monomer, or to prevent the formation of gas bubbles therein which might otherwise arise from the release of the pump pressure used to convey the monomer at the time the monomer is dosed.

It is another object of the present invention to provide for the assembly of a large number of small independent mold parts at a high production rate with precise registration of the front and back curve mold parts.

It is another object of the present invention to provide an apparatus in which a polymerizable hydrogel is pumped to a plurality of lens molds formed of a first concave or front curve mold half, and a second convex or back curve mold half. The mold halves are formed from polystyrene or other material transparent to actinic radiation. The second or convex mold half may be thinner than the first or concave mold half to enable mold compliance in the event the mold halves are clamped together. Clamping pressure may be used to align the flanges formed on the first and second mold halves to insure that the flanges are parallel and that the respective curves of the mold are aligned. Clamping pressure may also be applied to seat the sealed mold half against an annular edge formed in the first mold half to essentially sever any excess monomer from the monomer contained within the mold. All of the foregoing is accomplished, under vacuum, at a high production rate or volume.

It is another object of the present invention to prevent the entrapment or formation of gas bubbles within the polymerizable hydrogel prior to polymerization.

It is another object of the present invention to provide an adjustable means for varying the clamping pressure as the first and second mold halves are clamped together.

BRIEF DESCRIPTION OF THE DRAWINGS

The foregoing objects and advantages of the present invention filling and assembling mold parts for contact lens may be more readily understood by one skilled in the art with reference to the following detailed description of the preferred embodiments, taken in conjunction with the accompanying drawings wherein like elements are designated by identical reference numerals throughout the several views.

FIG. 5 is a partially cross-sectioned side view of the filling station used for depositing a predetermined amount of monomer in each of the mold cavities.

FIG. 6 is a simplified diagrammatic view of a monomer degassing and pumping system utilized in the present invention.

FIG. 7 is a diagrammatic time line illustration of the assembly step of the present invention.

FIG. 11 is a cross-sectional view of the vacuum manifold used in the reciprocating module of the assembly station illustrated in FIG. 10.

FIG. 12 is a plan view of the vacuum manifold illustrated in FIG. 11.

DETAILED DESCRIPTION OF THE PREFERRED EMBODIMENT

Figure 3:
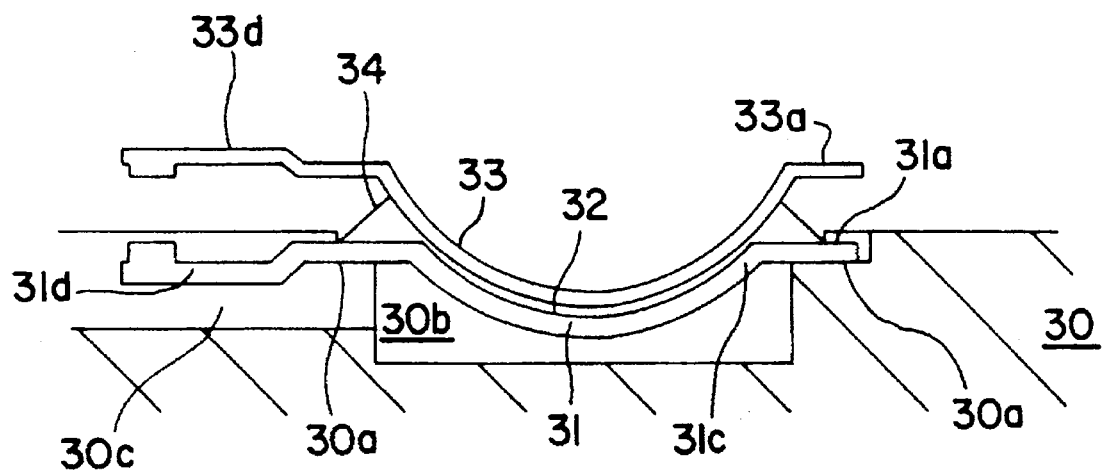
FIG. 3 is a cross-section view of an assembled mold as carried in the carrier illustrated in FIG. 2.

The present invention is useful in a process for forming soft contact lenses from a polymerizable monomer or monomer mixture. The soft contact lenses are formed in a mold assembly having a first concave and a second convex mold half. As illustrated in FIG. 3, the mold halves are formed of polystyrene transparent to visible and ultraviolet light, with a central curved section defining a concave surface 31, a convex surface 33 and circular circumferential edge 31(c), and integral with said edge an annular essentially uniplanar flange 31(a). At least a part of the concave surface 31 and the convex surface 33 have the somewhat diminished dimensions of the front or back curves, respectively of a contact lens to be produced in the mold assembly, and are sufficiently smooth that the surface of the contact lens formed by polymerization of said polymerizable composition in contact with the surface is optically acceptable. The mold is thin enough to transmit heat rapidly therethrough and has rigidity sufficient to withstand prying forces applied to separate the mold halves during demolding.

A common defect in contact lenses formed in accordance with this process is the inclusion of air bubbles which are trapped between the monomer and the mold at deposition.

In the present invention, the monomer is degassed prior to pumping as more particularly described in U.S. patent appln. U.S. Ser. No. 08/212,624, entitled Method and Apparatus for Making an Ophthalmic Lens, assigned to the assignee of the present invention, the disclosure of which is incorporated herein by reference thereto. This process removes part of the dissolved gasses present in the monomer mixture prior to the pumping of the monomer to the deposition or filling station. Discharge of the monomer from the supply nozzle into the front curve mold half can optionally be done under vacuum to insure that no gasses are trapped between the monomer and the front lens mold as the monomer is deposited.

The complimentary pair of first 31 and second 33 mold halves which define the shape of the final desired lens are used to direct mold the monomer mixture wherein the mixture is dissolved in a nonaqueous water displacable solvent as described in U.S. Pat. Nos. 4,680,336, 4,889,664 and 5,039,459. After the deposition or dosing step, in which the front concave mold half 31 is substantially filled with a polymerization mixture 32, the concave front mold half 31 is covered with a base mold half 33 under a vacuum to ensure that no air bubbles are trapped between the mold halves.

The first and second mold halves may then be clamped together in the assembly step to displace any surplus monomer from the mold area and to properly align the mold halves by alignment of the mold flanges.

Following this mold assembly and clamping step, the first and second mold halves are then clamped together a second time in a precure step wherein the polymerization mixture is exposed to actinic light, preferably from a UV lamp, while the mold halves are clamped. Typically, the mold halves are clamped for approximately 40 seconds with 30 seconds of actinic radiation. At the completion of the precure step, the polymerization mixture has formed a partially polymerized gel, with polymerization initiated throughout the mixture.

Following the precure step, the monomer/solvent mixture is then cured in a UV oven whereby polymerization is completed in the monomer(s). This irradiation with actinic visible or ultraviolet radiation produces a polymer/solvent mixture in the shape of the final desired hydrogel lens. After the polymerization process is completed, the two halves of the mold are separated in a demolding step leaving the contact lens in the first or front curve mold half, from which it is subsequently removed. The front and base curve mold halves are typically used for a single molding and then discarded or disposed of. After the demolding step, the solvent is displaced with water to produce a hydrated lens which when fully hydrated and buffered will be the final shape and size of the lens. In most cases, this is nominally 10% larger than the original molded polymer/solvent article.

The compositions to which this process may be directed include copolymers based on 2-hydroxyethyl methacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacryl acid, glyceryl methacrylate, and dimethylamino ethyl acrylate.

Preferred polymerizable compositions are disclosed in U.S. Pat. No. 4,495,313 to Larsen, U.S. Pat. No. 5,039,459 to Larsen et al. and U.S. Pat. No. 4,680,336 to Larsen et al., the disclosures of which are hereby incorporated herein by reference. Such compositions comprise anhydrous mixtures of a polymerizable hydrophilic hydroxy ester of acrylic acid or methacrylic acid and a polyhydric alcohol, and a water displaceable ester of boric acid and a polyhydroxyl compound having preferably at least 3 hydroxyl groups. Polymerization of such compositions, followed by displacement of the boric acid ester with water, yields a hydrophilic contact lens. The mold assembly of the present invention described herein may be used to make hydrophobic or rigid contact lenses, but the manufacture of hydrophilic lenses is preferred.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necessarily, have at least two ethylenically unsaturated double bonds.

The polymerizable compositions generally also include a catalyst, usually from about 0.05 to 1% of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by ultraviolet light, electron beam or a radioactive source may also be employed to catalyze the polymerization reaction, optionally with the addition of a polymerization initiator. Representative initiators include camphorquinone, ethyl-4-(N,N-dimethylamino)benzoate, and 4-(2-hydroxyethoxy)phenyl-2-hydroxyl-2-propyl ketone.

Polymerization of the polymerizable composition in the mold assembly is preferably carried out by exposing the composition to polymerization initiating conditions. The preferred technique is to include in the composition initiators which work upon expose to ultraviolet or visible radiation; and exposing the composition to ultraviolet or visible radiation of an intensity and duration effective to initiate polymerization and to allow it to proceed. For this reason, the mold halves are preferably transparent to ultraviolet or visible radiation. After the precure step, the monomer is again exposed to ultraviolet or visible radiation in a cure step in which the polymerization is permitted to proceed to completion. The required duration of the remainder of the reaction can readily be ascertained experimentally for any polymerizable composition.

After the polymerizable composition has polymerized, the mold assembly is disassembled to permit further processing of the polymerized product into a contact lens (such processing including e.g. washing and hydrating, packaging and sterilizing of the lens). Preferably, the flanges of the front and base mold halves are gripped and pulled away from each other, either in directly opposite directions or through an angle in a prying sort of motion. Advantageously, the assembly is first heated moderately to facilitate separation of the polymerized article from the mold half surfaces.

METHOD OF OPERATION

Figure 1:
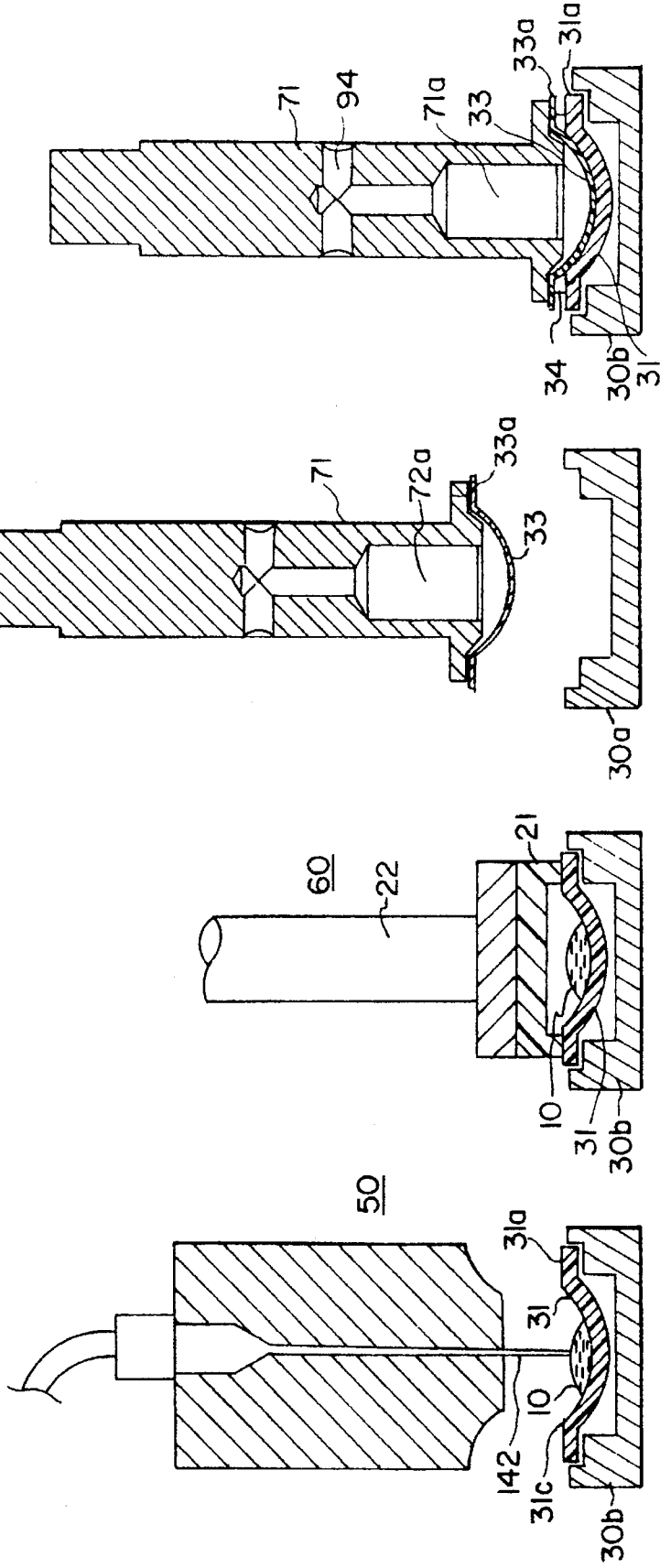
FIG. 1(a)–1(d) is a diagrammatic and illustrated flow diagram of the method of the present invention.
FIG. 1(e) is a block diagram flow chart of the process of the present invention.

FIG. 1(e) is a block diagram of the method of the present invention and FIGS. 1(a)–(d) are diagrammatic illustrations of the method of the present invention. As illustrated in FIG. 1(a), specialized carriers or pallets 30 are fed to the deposition and assembly stations carrying, on alternate pallets, front curve mold halves and back curve mold halves. As will be more fully described with respect to FIG. 4, the pallets arrive in alternating sequence with the pallet containing back curve halves first in sequence, followed immediately thereafter by a pallet loaded with front curve mold halves. These pallets are then conveyed into the filling and mold assembly stations sequentially at the rate of approximately 1 pallet each 6 seconds.

As illustrated in FIG. 1(a), a predetermined amount of the polymerizable hydrogel or monomer 10 is deposited in a front curve mold half by means of a precision dosing nozzle 142, which is part of the dosing or filling station 50. The monomer may be dosed under vacuum in each of the front curve mold halves, carried in the alternating pallets, to avoid the possibility of entrapping any gasses between the monomer and the front curve mold half 31. Further, as will be further described with respect to FIG. 6, the polymerizable monomer mixture may be degassed to insure that significant dissolved gasses are not present in the monomer inasmuch as dissolved gasses may well form bubbles as the monomer is exposed to vacuum conditions.

In the preferred embodiment of the invention, approximately 60 μl of polymerizable hydrogel or monomer is deposited in the front curve mold half to insure that the mold cavity is overdosed, in order to avoid the possibility of incomplete molding. The excess monomer is removed from the mold cavity in the final step of the assembly of the front and back curve mold halves as will be hereinafter described.

The second station in the apparatus for depositing and assembling the mold parts is a stamping station schematically illustrated in FIG. 1(b), and more fully described in U.S. Ser. No. 08/258,263, entitled Method and Apparatus For Applying a Surfactant to Mold Surfaces, also assigned to the assignee of the present invention. As illustrated in FIG. 1(b), the annular flange 31(a) surrounding the front curve mold half is stamped via stamp pad 21 with a thin film of surfactant which has been found useful in removing the excess monomer displaced from the mold cavity at the time of assembly. The excess monomer (when hydroxyethylmethacrylate is used, it is referred to as "HEMA") is displaced between the flanges 31(a) and 33(a), as illustrated in FIG. 1(d) to form a ring 34 of excess HEMA at the time of mold assembly. This HEMA ring is also cured contemporaneously with the polymerizable hydrogel that forms the contact lens 32.

By stamping the front curve mold flange 31(a) with a mold release surfactant, the HEMA ring 34 preferentially adheres to the back curve mold half flange 33(a) and is removed from the production line at the time the back curve mold half is removed at mold disassembly. In the preferred embodiment, the mold release surfactant is a polyethylene oxide sorbitan mono-oleate, commercially sold under the trade name "Tween 80".

The stamping head station 60 includes mounted therein a plurality of stamps 21 each adapted to be moved in vertical reciprocatory movement in a coordinated matter by pistons 22 mounted in the stamping head station 60, wherein the number of stamps 21 is correlated with the number of front curves 31 carried by mold pallet 30.

Adapted to be positioned in spaced relationship below the lower end of each stamp 21 when the stamp is in a raised position, is a horizontally shiftable pad member (not shown) which is constituted of a suitable porous material, such as porous polyethylene having an average 10 micron pore size, and which is impregnated with a solution containing a surfactant, the latter of which may be present in a highly concentrated state. The upper surface of the pad member is covered by a filter, preferably of nylon, having a mesh size of 1.2 microns so as to act as a metering device and allow only relatively small quantity of surfactant to pass therethrough as the surfactant is wicked from the bottom of the pad member to the top upon the pad member being pressingly contacted by the bottom ends of the stamping heads 21.

The method of operation of the assembly station will be hereinafter described with respect to FIGS. 1(c)–1(d) and FIG. 7. As pallets 30 containing the back curve mold halves 33, which are first in the alternating sequence, enter the assembly station, a plurality of reciprocating vacuum grip pistons 71 are reciprocated downwardly, as will be more fully described with respect to FIGS. 8–12 to pick up the back curve mold halves from the first of the alternating pallets 30. The back curve mold halves are lifted by means of a vacuum drawn in chamber 71(a) which secures the back curve mold half to the reciprocating piston 71. After the back curve pick up, the empty back curve pallet 30 is advanced, and a second pallet containing the front curve mold halves and monomer is advanced under the reciprocating piston as illustrated in FIG. 1(d). A vacuum is then drawn around the entire assembly to insure that no gasses are trapped between the mold halves and the monomer at the time the mold is assembled. The reciprocating piston 70 is then driven downwardly to contact the monomer and displace it through the monomer to define the mold cavity. As a reciprocating piston 71 continues to descend downwardly until the monomer overflows the cavity. Optionally it may seat the back curve mold half 33 against the circumferential parting edge 31(c) of the front curve mold half to thereby align the mold parts and to displace the excess monomer into the space between the flanges 31(a), 33(a) to form the excess HEMA ring 34. The back curve mold half may then be clamped to the front curve mold half by means of a floating over travel mechanism that will be hereinafter explained in detail with respect to FIG. 8. After a predetermined period, the vacuum in chamber 71(a) is broken but the clamping pressure from piston 21 is retained during overtravel of the assembly module. Then the vacuum surrounding the assembled mold halves and reciprocating piston 71 is broken, and reciprocating piston 71 is retracted to allow pallet 30 to be transferred out of the assembly station to the precure station.

The assembly of the mold halves is also described in the chart illustrated in FIG. 7 in which the position of reciprocating piston 71 is plotted as a function of time. As illustrated at the zero start point, the reciprocating piston 71 begins to descend for the back curve pick up, and reaches and secures the back curve in approximately 0.25 seconds. The piston 70 is then reciprocated upwardly to its upper position 14 mm above pallet 30 in approximately 0.25 seconds. Then, the pallets are advanced wherein the back curve mold half pallet is removed and the front curve mold half pallet is inserted, which transfer takes approximately 0.5 seconds. While the pallets are being transferred, a vacuum chamber begins its descent towards the front curve mold pallet 30 and contacts the mold pallet to establish a seal between the chamber and the pallet as will be hereinafter more fully described with respect to FIG. 8. A seal is established at approximately 1.25 seconds after the zero point, and the nitrogen in the chamber is then evacuated until a vacuum equilibrium is reached at approximately 1.75 seconds.

It should be noted that the reciprocating piston 71 is carried within the vacuum chamber so that as the vacuum chamber descends and seals to the pallet, the reciprocating piston 71 and the back curve mold half 33 have been partially lowered to approximately 5 mm above the front curve mold half. At 1.75 seconds, the reciprocating piston 71 begins independent downward travel and contacts the monomer at approximately 2.5 seconds after the zero point. Downward travel of the reciprocating piston continues and at approximately 3 seconds, the back curve mold half is firmly seated on the parting edge 31(c) of the front curve mold half indicating formal assembly. Shortly thereafter, the vacuum in chamber 71(a) is broken, but the reciprocating piston 71 maintains a downward force on the back curve mold half while the remainder of the assembly module continues a downward travel to establish an independent floating clamping of the back curve mold halves against a front curve. At approximately 3.4 seconds, the vacuum is broken in the vacuum chamber, and at approximately 4.4 seconds the reciprocating piston 71, the vacuum chamber and the assembly module begin to retract. At 4.75 seconds, the pallet containing the assembled mold halves is transferred out of the assembly station, and a new pallet containing the back curve mold halves is inserted under the mold assembly module. At approximately 5 seconds, the reciprocating piston 71 is then moved to its back curve pick up position, and at 6 seconds, the assembly begins anew at the zero start point.

THE FILLING AND ASSEMBLY APPARATUS

Figure 4:
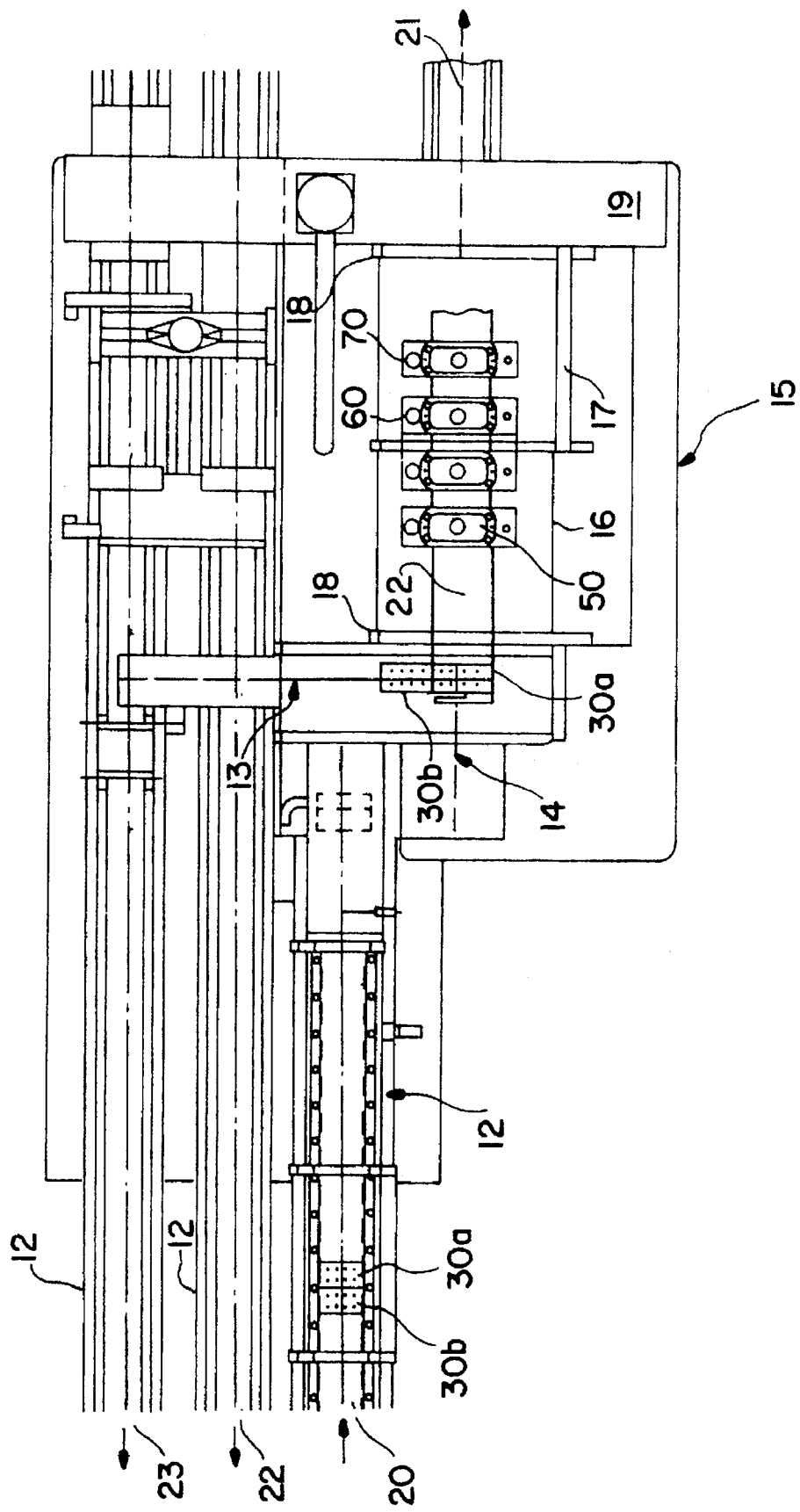
FIG. 4 is a diagrammatic top plan view of the filling and assembly stations of the present invention.

The present invention is illustrated in plan view in FIG. 4 in which conveyor 20 provides a sequenced supply of alternating pallets two of which are schematically illustrated in FIG. 4 as 30(a) and 30(b). In the preferred embodiment of the invention, pallet 30(a) contains 8 back curve mold parts and pallet 30(b) contains 8 front curve mold parts. These pallets travel on conveyor 20 in a nitrogen tunnel 12 which surrounds each of the conveyors and material handling devices to provide a low oxygen environment for all of the component parts prior to polymerization. Material handling pallet pushers 13 and 14 direct the pallets from conveyor belt 20 to the filling and assembly station 15, which is also enclosed within a nitrogen enclosure 16. Enclosure 16 may be pivoted up and out of the way for servicing via means of handle 17 and hinges 18. Within the filling and assembly station 15 there is the filling or dosing assembly 50 for filling the front curves with a predetermined precision dose of monomer, an apparatus 60 for applying a mold release surfactant to the flange area of the front curve molds, and the mold assembly station 70. Following assembly, the empty back curve mold pallets are returned by material handling pusher 19 to the back curve pallet return conveyor 22, while the filled and assembled mold assemblies are conveyed in their respective pallet via conveyor 21 to the precure station.

The material handling apparatus 14 is a precision device which pushes the pallets one at a time onto track 22 to be processed by the various stations in the deposition and assembly apparatus. The pallets are advanced serially, with each advance stroke being the width of the pallet ±0.1 mm. This enables placement of the pallets for precision registration in the various modules of the filling and assembly station 15.

Figure 9:
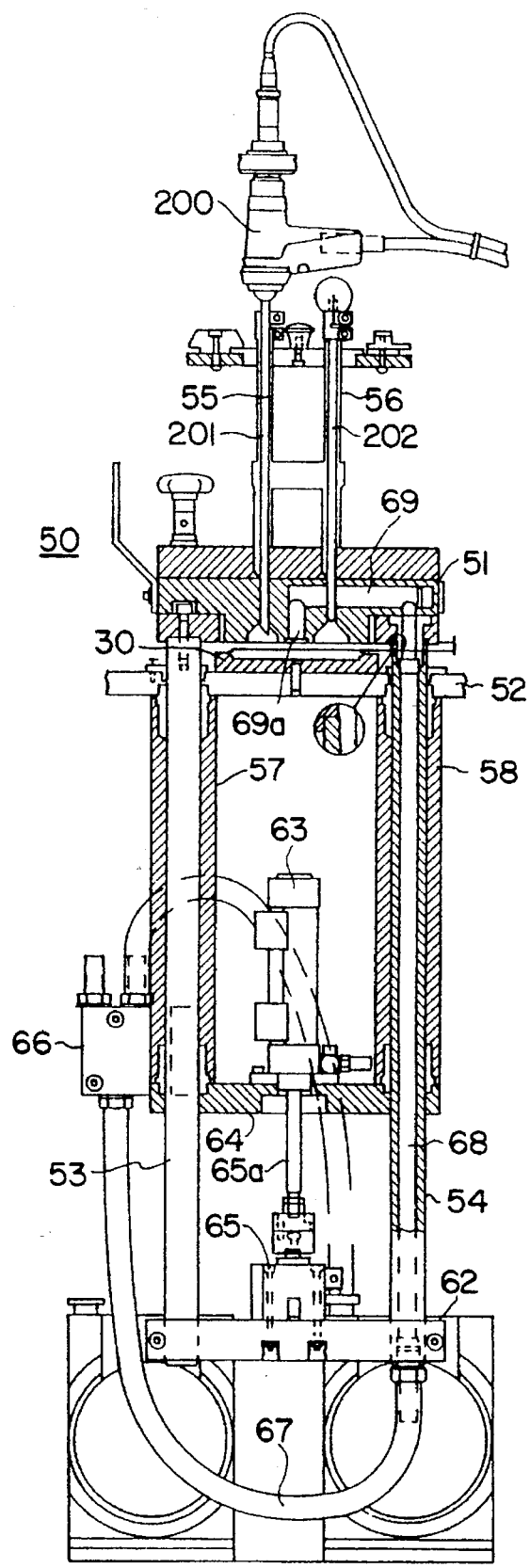
FIG. 9 is a diagrammatic and partially cross-sectioned illustration of the dosing or filling station of the present invention illustrating the vacuum interconnections to the reciprocating filling module.

The filling or dosing station 50 will be hereinafter described with respect to FIGS. 5, 6 and 9, wherein FIGS. 5 and 9 are partially cross-sectioned views of station 50 and FIG. 6 is a schematic illustration of the monomer degassing that occurs prior to the dosing of the individual mold cavities. The monomer is substantially degassed to avoid the formation of gas bubbles in the dosed monomer, at either the time of dosing or the time of mold assembly, inasmuch as the bubble will induce cavitation or puddling of the monomer during polymerization thereby rendering the lens defective and unusable.

As illustrated in FIG. 6 the monomer or monomer mixture is provided in containers 100, typically 15 liters in volume. The container is connected to the monomer degassing system by means of line 112. Suction is developed by pump 114 to draw the monomer from the drum 100, through line 112, to pump 114, and out the pump discharge 116. While going through discharge line 116, the monomer passes through filter 118 in order to remove any extraneous particulate contaminants that may be present in the monomer.

The monomer is then provided to the inlet 120 of the degas unit 122. Within the degas unit, the monomer is divided among a plurality of tubes 124, and then recombined into a degas unit discharge 126. The degas unit is operated under a low ambient pressure, typically around 1–40 torr which is provided by vacuum pump 128. This vacuum pump is attached to the degas unit 122 by line 130 and discharges the excess air from the degas unit by way of line 132. The tubing members 124 are formed preferably of a gas permeable tubing such as STHT tubing produced by Sanitec, Inc. of Andover, N.J. from Q74780 Medical Grade Silicon Rubber manufactured by Dow Corning of Midland, Mich. While two tubes are illustrated in FIG. 6, it is understood that a plurality of tubes, typically 10 tubes are provided for the degas unit 122.

After the monomer exit the degas unit 122 by discharge line 126, it passes through an oxygen monitor 134. This monitor measures the residual oxygen within the monomer to insure that the degas unit is functioning properly. If the oxygen content of the monomer is indicated as being to high, operation of the production line can be halted until the problem is corrected in order to avoid the production of defective lenses.

Once oxygen monitor 134 has determined that the oxygen content of the monomer is sufficiently low, the monomer passes through line 136 into manifold 138. The manifold is used as a common source to supply a plurality of precision dose pumps 140 used to fill the individual contact lens mold at the monomer dosing station 50. The pumps 140 used to pump the processed monomer delivered to manifold 138 are IVEK pumps made by the IVEK Corporation of North Springfield, Vt. These pumps provide precision doses of degassed monomer to the mold cavities 31 via nozzles 142.

As was hereinafter previously described with respect to FIG. 1(a). The monomer is supplied from pumps 140 to nozzles 142 via supply lines 141 which may include coupling blocks 143 to aide in servicing the equipment. Each of the supply lines 141 is coupled to an associated discharge nozzle 142, two of which are illustrated in FIG. 5 which are suspended directly over the path of the pallet 30 and the individual front curves 31. The dosing station 50 includes a manifold block 51 for receiving each of the monomer discharge nozzles 142 and a vacuum seal 52 which may be used to cooperate with the outer perimeter 110(a) of pallet 30 to provide a sealed enclosure that may be evacuated with a vacuum pump so that the deposition of the monomer occurs in a vacuum. The manifold block assembly 51 reciprocates with respect to a fixed platform 52 on a pair of tubes or cylinders 53, 54 as will be hereinafter described with respect to FIG. 9. The dosing module 50 also includes a pair of bore scope tubes 55, 56 which enable inspection of the monomer dosing, if desired, through a fiber optic bore scope 200.

As illustrated in FIG. 9, the entire deposition module 50 is reciprocated vertically with respect to a fixed support frame 52 and 64 by means of a short stroke pneumatic cylinder 65 mounted on moveable frame 62 and to fixed frame 64 by drive rod 63a of pneumatic cylinder 63. Vacuum is supplied through the filling or dosing station through manifold 66 and vacuum line 67 to an interior manifold 68 formed in one of the two tubes 53,54. The tubes or cylinders 53,54 reciprocate with fixed guide tubes 57,58. A vacuum plenum is also formed in the manifold block 51 by means of bore holes 69 and 69(a) which provide vacuum communication between the vacuum manifold 66 and the interior of the dosing station 50 defined by perimeter seal 52 and the pallet 30.

An optic bore scope 200 is illustrated in FIG. 9 with an optic probe 201 extending down into the cavity defined by pallet 30 and manifold block 51. A dummy or blind 202 is installed in the other bore scope tube 56 to seal access into the interior vacuum plenum of the assembly station 50 when a bore scope is not in use.

In operation, a pallet 30 is advanced into the filling or dosing station 50 by means of the material handling ram 14 previously discussed with respect to FIG. 4. Once in position, the manifold assembly 51 is reciprocated downwardly by means of pneumatic cylinder 63. As the vacuum seal 52 on the manifold assembly 51 engages the pallet 30, the sensor assembly 65 may be triggered, thereby opening a valve to draw a vacuum in manifold 66, vacuum line 67, manifold 68 and plenum 69, 69(a). It should be noted that a vacuum is not required for filling or dosing of the mold cavities, but does avoid the possibility of $N^2$ gas being trapped between the monomer and the front curve mold half. It should also be noted that the ambient atmosphere surrounding pallet 30 is a low oxygen $N^2$ environment and evacuation of the chamber is an evacuation of the $N^2$ gas. After vacuum has been established within the dosing chamber, pumps 140 are actuated to deliver a controlled dose of 60 μl to each of the mold cavities 31 illustrated in FIG. 5.

Each of the nozzles 142 includes a teflon dosing tip with an O.D. of approximately 0.070" and on I.D. of approximately 0.040 I.D. Each tip is cut at approximately a 45° angle, and is positioned to be carried within 0.5 mm of the horizontal tangent of the front curve 31 at the time of dosing.

As the monomer or monomer mixture is dosed, it pools upwardly around the tip, as illustrated in FIG. 1(a), so that the angle of the tip is covered. When the manifold assembly 51 is reciprocated upwardly, the pool of monomer wicks the nozzle tip, and draws any excess monomer form the face of the tip to avoid drop formation on the tip. This wicking action increases the accuracy of the dose, it pulls off potential drops of monomer and it avoids any agitation of the monomer that might result in bubble formation.

If drops of monomer form on the tip, there is the possibility of contamination of a passing pallet or the dosing station from an inadvertent drop. Individual drops of monomer, even when deposited into a mold cavity, or on top of the monomer pool, have been found to generate a "seed" site for a gas bubble. By wicking the tip with the monomer pool, this possibility is substantially eliminated.

After the monomer has been dosed into the individual mold cavities, the vacuum is broken in manifold 66 and the manifold assembly 51 is reciprocated upwardly by pneumatic drive means 63 to allow transport of the pallet 30 to the apparatus 60 which coats the mold flange with a mold release surfactant. The filling module 50 can be raised to a high service position by means of pneumatic cylinder 63.

MOLD ASSEMBLY APPARATUS

Figure 8A:
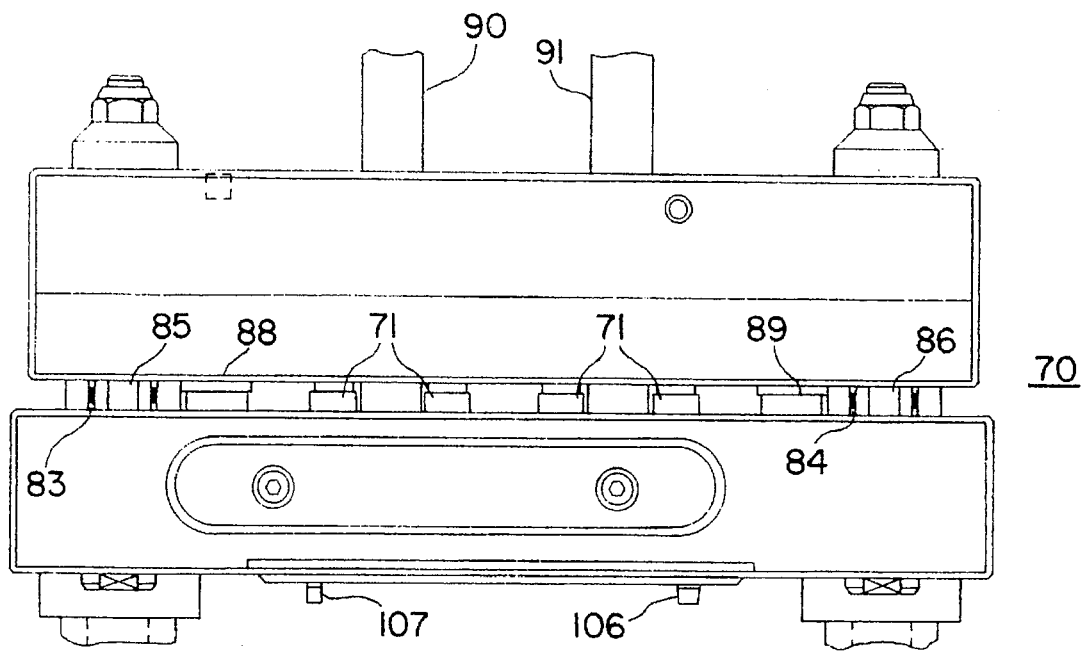
FIG. 8(a) is a diagrammatic side view of the exterior of the assembly module of the present invention.
Figure 8B:
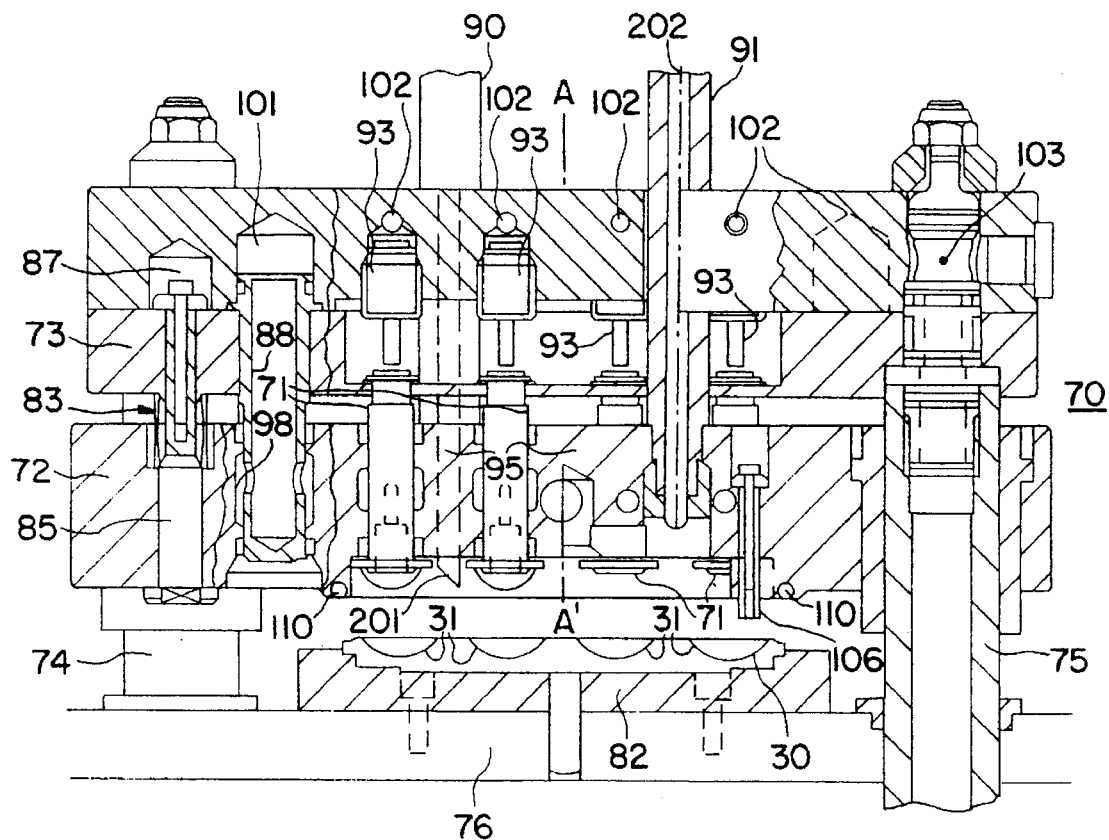
FIG. 8(b) is a partially cross-sectioned side view of the assembly module illustrated in FIG. 8(a).

The operation of the assembly station of the present invention will be explained with reference to FIGS. 8 and 10–12 wherein FIG. 8(a) represents an external elevation view of the assembly module 70 and FIG. 8(b) represents a partially cross-sectioned view of the assembly module 70 that is sectioned along two separate axes from section line A–A' for the purposes of illustration. The assembly station 70 includes 4 reciprocal pistons 71, two of which are illustrated in the left section of a–a' of FIG. 8(b) with back curves attached thereto and two of which are partially visible in the right hand section of a–a' of FIG. 8(b) without back curves. It should be understood in the preferred embodiment of the invention 8 reciprocating pistons are used for pallets having 8 sets of front and back curve mold halves. The reciprocating pistons 71 are mounted for reciprocation within the vacuum housing 72 and are both carried by and may float within the primary housing 73. Each of the three members 71, 72 and 73 reciprocate at various times, both with respect to each other and with respect to the pallet 30 and the pallet front mold curves 31.

Figure 10:
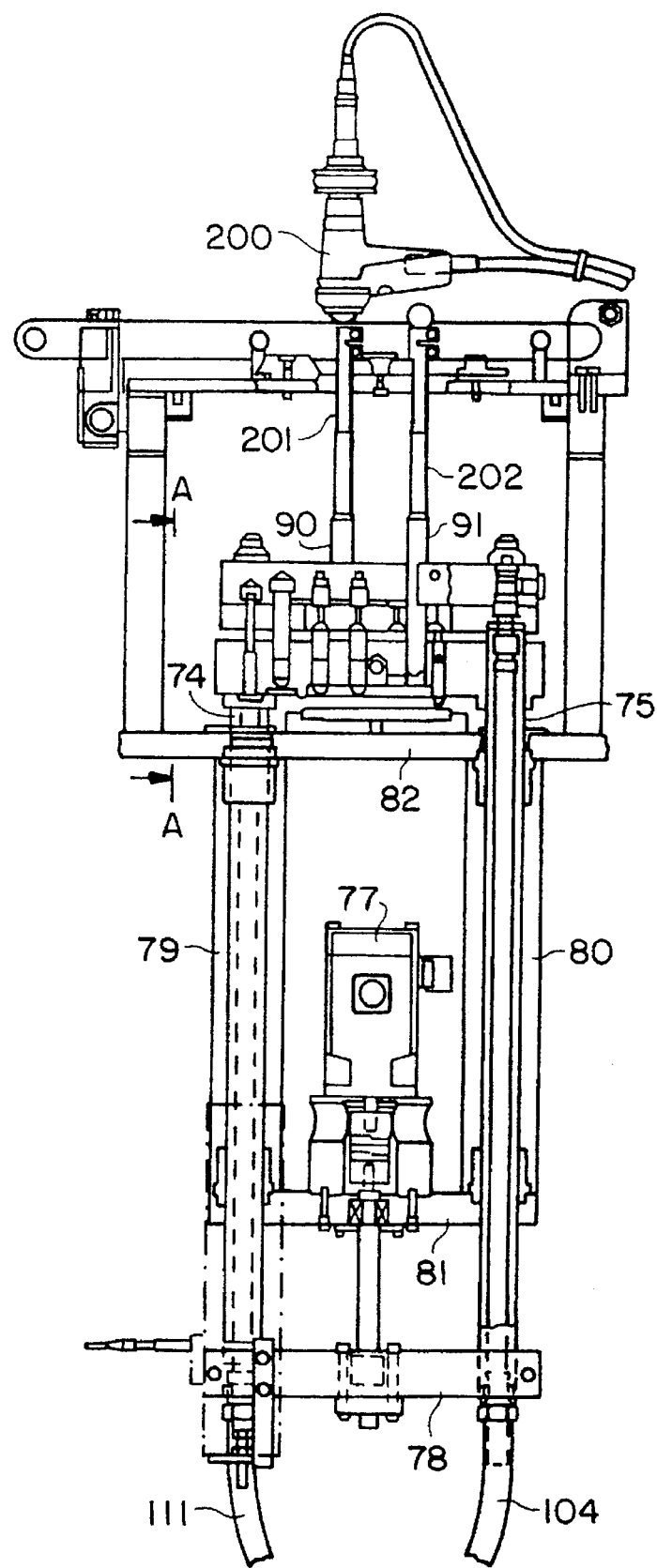
FIG. 10 is a diagrammatic and partially cross-sectioned illustration of the assembly station of the present invention illustrating the vacuum supplies for the reciprocating assembly station.

With reference to FIGS. 8(b) and 10, the vacuum manifold housing 72 and the primary housing 73 are mounted for reciprocal movement on cylinders or tubes 74,75 and reciprocate with respect to stationary frame member 76 in response servo motor 77 which raises and lowers a reciprocating support platform 78. Drive motor 77 is fixably attached to frame member 76 by means of guide tubes 79 and 80 and cross-member 81. Thus, the stationary frame member 76, guide tubes 79,80 and cross-member 81 provide a box frame that is stationary with respect to the reciprocating members of the apparatus. The pallet guide rails 82 are also fixed with respect to the stationary fixed platform 76. As indicated previously, the pallet 30 is advanced through the pallet guide rails 82 by means of the material handling pusher 14 previously described and illustrated with respect to FIG. 4.

As illustrated in FIG. 8(b), the vacuum manifold housing 72 and the primary housing 73 reciprocate with respect to each other with the vacuum manifold housing 72 being biased downwardly by a pair of spring members 83,84 positioned on opposite sides of the respective housings. The vacuum manifold housing 72 is secured to the primary housing 73 by virtue of a pair of bolts 85,86, one of which is illustrated in cross-section in FIG. 8(b) as 85, which are free to reciprocate upwardly into a recesses such as recess 87 formed in the primary housing. Likewise, the reciprocating pistons 71 and reciprocating manifold members 88,89 also provide reciprocating guides and support between the two housing members 72,73.

A pair of bore scope housings 90 and 91 provide access for a bore scope 200 and a fiber optic probe 201 which may be inserted into the assembly cavity for viewing or quality control purposes. When not in use, the bore hole housings 90,91 are closed by a blind 202 in order to allow a vacuum to be drawn within the assembly housing.

In operation, a pallet 30 containing mold half back curves is advanced under the reciprocating pistons 71 as was previously described with respect to FIG. 1(c). When the pallet is in position, the assembly module 70 is reciprocated downwardly by pneumatic drive motor 77 and cross-member 78 and the reciprocating tubes 74,75 to draw both the vacuum manifold housing and the primary housing downwardly. The vacuum manifold housing 72 is biased in its downward position by means of springs 83,84 and the individual reciprocating pistons 71 are biased downwardly by virtue of their mounting within the vacuum manifold housing 72, and by virtue of air pressure maintained within the pneumatic cylinders 93 mounted in the upper portion of primary housing 73 pneumatic cylinder 73 are pressurized by plenum cavity 102 which connects each of the cylinders 92 to a common air pressure service. Within approximately 0.25 seconds, the reciprocating pistons 71 have engaged the back curve mold halves on pallet 30 and a vacuum is drawn through vacuum manifold 71(a) in reciprocating piston 71, which has radial bores 94 which communicate with an annular chamber 95 formed in the vacuum manifold housing 72, two of which are illustrated in FIG. 8(b) and 11. Each of these annular chamber passageways 95 is interconnected to each other and a common plenum 97 that extends across all 4 annular manifolds 95 on one side of the vacuum manifold housing 72.

A pair of reciprocating vacuum manifolds 88,89 connect the vacuum manifold 72 with the primary manifold 73, with one of the tubes 88, illustrated in cross-section in FIG. 8(b). The vacuum manifold 88 reciprocates in bore 98, while vacuum manifold 89 reciprocates in bore 99. These reciprocating manifolds are essentially identical, except that they supply vacuum at two different pressures to two different parts of the assembly module.

As illustrated in FIGS. 12 and 8(b), the longitudinal plenum 97 terminates in annular chamber 99 which in turn communicate with a reciprocating vacuum manifold 89 and an upper plenum cavity 102. Plenum 102 is connected to the upper portion of vacuum assembly 103 which in turn communicates with the reciprocating cylinder or tube 75. The vacuum maintained in reciprocating tube 75 is in turn drawn by vacuum line 104 through a shut-off valve and manifold (not shown). Thus, vacuum drawn through vacuum tube 104 pulls the $N^2$ present in the low oxygen environment through the reciprocating pistons 71 into common plenums 95,97 in the vacuum manifold housing, upwardly through reciprocating manifold 89 into the primary housing, and then downwardly through the reciprocating tubes 75 for exhaust.

Figure 2:
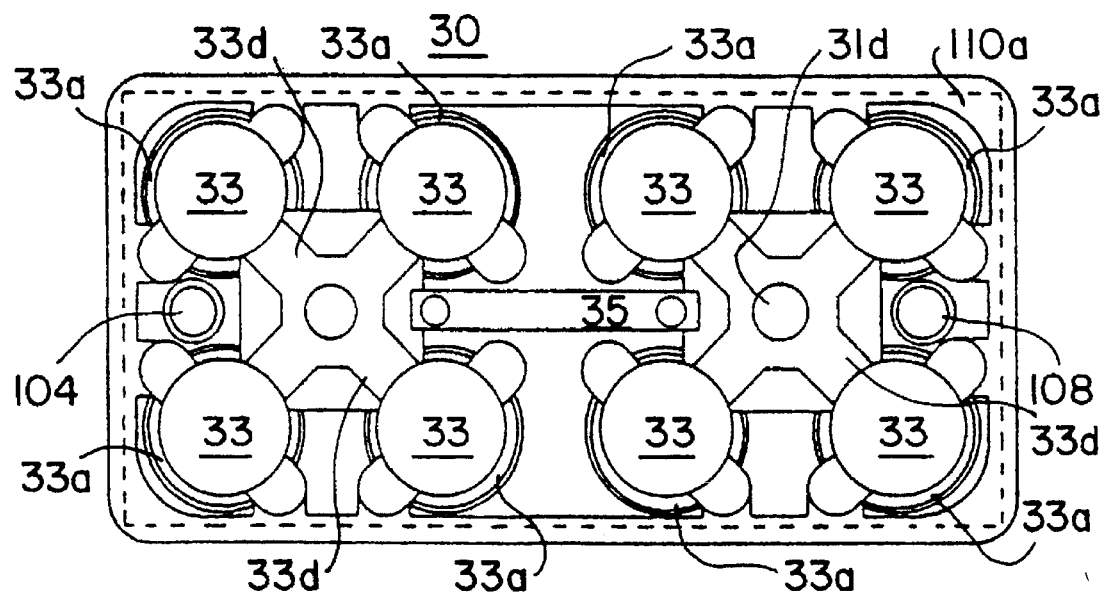
FIG. 2 is a plan view of a carrier used to transport a plurality of contact lens molds to and from the filling and assembly station.

As the assembly module reaches its lower most point of travel, each of the back curves is removed from the back curve mold pallet 30 by the vacuum drawn in the reciprocating pistons 71. The entire assembly module 70 is then reciprocated upwards in approximately 0.25 seconds to enable transport of the empty pallet 30 out of the assembly module and the insertion of a new pallet 30(b) that is filled with front curve mold halves, each one of which has been dosed with a monomer at the filling module 50. Pallet 30(b) is advanced into position as previously described with respect to FIG. 4, but is registered in precise position by means of tapered registration pins 106,107 which cooperate with the blind registration holes 108,109 formed on pallet 30, as illustrated in FIG. 2. The tapper on pin 106 is sufficient to register the pallet within ±0.1 mm for the purposes of precision assembly of the mold halves.

The assembly cycle begins by reciprocating both the vacuum manifold housing 72 and the primary housing 73 downwardly until a perimeter seal 110 contacts the outer perimeter 110(a) of the pallet 30. As contact is made with the perimeter seal, a vacuum switch is actuated by means of a proximity switch adjacent to reciprocating cross-head 78 which actuates a second vacuum source which is drawn through vacuum tube 111 and the interior of reciprocating drive tube 74 to evacuate the chamber formed between the vacuum manifold housing 72 and the platform 30. The vacuum is drawn, as illustrated in FIGS. 8(b), 11 and 12 through the center of the vacuum manifold housing 72 by virtue of a common plenum 115 which empties into a center bore hole 116 which is in turn connected to longitudinal manifold 96 and the annular chamber 98 and through the vacuum manifold tube 88 to the upper primary housing manifold 101, and from this passageway via a connecting manifold to the interior of reciprocating drive tube 74 in a manner similar to that previously described and illustrated with respect to manifold 102 and the interior of drive tube 75.

It should be noted that the vacuum drawn in the two reciprocating drive tubes 74,75 is slightly different, with the vacuum drawn in the tube 75 being slightly greater than that drawn in tube 74 in order to insure that the back curves are retained on the reciprocating pistons 71 prior to their deposition on the monomer and the front curve mold half. In the preferred embodiment, the pressure drawn in the vacuum manifold around the pallet 30 is on the range of 5 to 7 millibars while the vacuum drawn within the reciprocating pistons 71 is on the order of 3 to 5 millibars.

After the vacuum has been established in the vacuum manifold housing 72, the vacuum manifold housing ceases to reciprocate and remains stationary with respect to the pallet 30. However, the upper or primary housing 73 continues to reciprocate downwardly enabling the back curves to contact the monomer and slowly displace it outwardly to fill the mold cavity as the two mold halves are assembled. The vacuum maintained around the housing enables the assembly of the two curves in a more rapid and expeditious manner than if assembled under ambient $N^2$ pressure. When assembled under vacuum, the deposition speed may reach as high as 5 mm per second, whereas without vacuum, any speed greater than 0.2–1 mm per second may result in undue agitation of the monomer and the creation of bubbles which effect and impair the quality of the resultant lens. Thus, the assembly stp which took 6 to 9 seconds under atmospheric conditions can now be accomplished in 1 to 2 seconds. Further, if a vacuum is not drawn, it is possible for nitrogen to be trapped between the mold halves or between the monomer and the back curve thereby creating another bubble or puddle which will result in rejection of that lens.

Independent travel of the two manifolds 72,73 is provided since the vacuum manifold housing 72 no longer reciprocates downwardly after it is seated on pallet 30. As illustrated, the apparatus of FIGS. 8 and 9 provide an optional clamping motion, wherein the upper primary housing continues to reciprocate downwardly depositing the back curve mold half, and continuing on to the Z overtravel point illustrated in FIG. 7, thereby compressing springs 83 and 86. As these spring members are compressed, the reciprocating pistons 71 float between the back curve mold halves 33 and pneumatic cylinders 93 mounted for reciprocation in manifold 73, which have been pressurized to a predetermined pressure. Thus, a clamping pressure is generated on the back curve mold member, as determined by the air pressure maintained in pneumatic cylinders 93, and not by spring members 83,84, or the pressure generated by drive motor 71. This enables independent reciprocal movement or floating movement of each of the reciprocal pistons 71, while enabling all of the pistons to be pressurized to a common predetermined value. Thus, misalignment of a single mold part will not destroy the entire batch of mold assemblies on pallet 30.

As was described earlier with respect to FIG. 1, the optional clamping pressure seats the back curve mold half on the front curve mold half and seats the convex portion of the curve against the parting ring 31(c) formed on the front curve mold half thereby severing the monomer in the lens blank 32 from the monomer in the excess HEMA ring 34. Also, as indicated in FIG. 7, after the mold halves have been seated, the vacuum in each of the reciprocating pistons 71 is first broken by opening a valve in vacuum line in 104. Shortly thereafter, and after a predetermined clamping period and a predetermined clamping pressure, the vacuum between the vacuum manifold housing and the pallet 30 is broken by opening a valve in vacuum line 111. Typically the period is 0.5 to 3 seconds, but preferably is 1.5 seconds. The clamping pressure may range from 0.5 to 2 Kgm/lens but preferably is 1 Kgm/lens. Thereafter, drive motor 77 is actuated and the entire assembly module 70 is raised upwardly and reset for a new back curve pickup and a new cycle of operation. In the event the optional clamping movement is not provided, the resilient biased pistons 71 are fixably mounted in vacuum manifold 72 and reciprocates downwardly to seat the back curve well into the monomer, but 0.1–0.2 mm from sealing engagement with the parting ring 31(c). In this embodiment the optional clamping step may also be provided in the precure step. When seated in this monomer, vacuum conditions, atmospheric pressure will "clamp" the mold halves together when the vacuum in the vacuum manifold 72 is broken.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

What is claimed is:

1. An apparatus for filling and assembling mold parts for a contact lens, said apparatus comprising;

(a) a first automated station for receiving a plurality of front curve contact lens mold parts and depositing therein a predetermined amount of a polymerizable monomer or monomer mixture;

(b) a second automated station for receiving said plurality of front curve mold parts and assembling each front curve mold part with a back curve mold part under vacuum to prevent entrapment of gas between the mold parts.

2. An apparatus as claimed in claim 1 wherein said front curve mold parts are transported to said first and to said second automated stations by a pallet.

3. An apparatus as claimed in claim 2 where said pallet includes registration guides to cooperate with said second station to register said pallet prior to assembly of said mold parts.

4. An apparatus as claimed in claim 3 wherein said pallet includes a perimeter seal area to cooperate with a perimeter seal formed at said second automated station to enable said assembly under vacuum.

5. An apparatus as claimed in claim 4 wherein said first automated station also includes a perimeter seal to enable said plurality of front curve mold parts to be filled with monomer or monomer mixture under vacuum.

6. An apparatus as claimed in claim 2 wherein said apparatus further includes separate pallets for said back curve mold parts, wherein said pallets having front curve mold parts are interleaved with pallets having back curve mold parts.

7. An apparatus as claimed in claim 6 wherein said second automated station has means to cycle between pallets, picking up back curves from a pallet having back curves in a first cycle, and depositing said back curves on said front curves in a second pallet during a second cycle to assemble said front and back curve mold parts.

8. An apparatus as claimed in claim 1 wherein said second automated station further includes a clamping device for clamping said mold parts together while under vacuum to displace any excess monomer or monomer mixture and to firmly seat and align the mold parts.

9. An apparatus as claimed in claim 8 wherein said clamping device includes means to clamp said mold parts with a predetermined, but adjustable pressure.

10. An apparatus as claimed in claim 1 wherein each mold part includes a flange member, wherein said apparatus further includes a station for coating the flange of said front curve mold part with a surfactant prior to assembly of said mold parts.

11. An apparatus as claimed in claim 1 which further includes a second apparatus for degassing the monomer or monomer mixture prior to deposit in said front curve mold part.

12. An apparatus for assembling front and back curve mold parts to form a contact lens, wherein each of said front curve mold parts has been filled with a predetermined quantity of a polymerizable hydrogel, said mold parts being supplied to said apparatus on one or more pallets, said apparatus comprising:
  (a) first means for transporting said pallets to said apparatus along a predetermined axis;
  (b) second means for removing said back curve mold parts from an associated pallet, and aligning said back curve with an associated front curve mold part;
  (c) a housing member for surrounding said aligned back and front curve mold parts to thereby enable a vacuum to be drawn around said parts; and
  (d) third means for reciprocating said second means and said back curve mold parts along a second axis to clamp said back curve mold part against said front curve mold part with a predetermined pressure while said vacuum remains drawn.

13. An apparatus as claimed in claim 12 wherein said second means and said third means reciprocate along parallel axes.

14. An apparatus as claimed in claim 13, wherein said second means includes a separate reciprocating member for each back curve mold part carried in said pallet.

15. An apparatus as claimed in claim 14 wherein each reciprocating member includes a sealing means for engaging said back curve and a vacuum port for drawing a vacuum between said reciprocating member and said back curve to thereby enable said reciprocating member to lift said back curve mold part from its associated pallet.

16. An apparatus as claimed in claim 15 wherein said reciprocating members reciprocate within said housing.

17. An apparatus as claimed in claim 16 wherein said third means reciprocates with said housing and said second means.

18. An apparatus as claimed in claim 17 wherein each of said reciprocating members are separately biased from a common air plenum with respect to said third means to allow independent reciprocation and clamping by each reciprocating means at a common predetermined pressure.

19. An apparatus as claimed in claim 15 wherein said apparatus further includes separate pallets for said back curve mold parts, wherein said pallets having front curve mold parts are interleaved with pallets having back curve mold parts.

20. An apparatus as claimed in claim 19 wherein said apparatus has means to cycle between pallets, picking up back curves from a pallet having back curves in a first cycle, and depositing said back curves on said front curves in a second pallet during a second cycle to assemble said front and back curve mold parts.

21. An apparatus as claimed in claim 20 wherein each of said pallets includes a registration means to cooperate with said apparatus to register said pallet prior to assembly of said mold parts.

22. An apparatus as claimed in claim 21 wherein each of said pallets includes a perimeter seal area to cooperate with a perimeter seal formed on said housing to enable said assembly under vacuum.

23. An apparatus as claimed in claim 18 wherein said reciprocating members reciprocate within said housing member, and said housing member reciprocates with said third means.

24. An apparatus as claimed in claim 23 wherein said housing member reciprocates with respect to said third means, and is resiliently biased by a biasing means to a first position with respect to said third means.

25. An apparatus as claimed in claim 24 wherein said biasing means establishes a predetermined crush bias between said housing and said pallet to maintain said vacuum within said housing during assembly of said mold parts.

26. A method of filling and assembling a pair of mold parts with a polymerizable monomer or monomer mixture to form a contact lens, said method comprising:
  (a) filling the second of a pair of mold parts with a predetermined dose of a monomer or monomer mixture; and
  (b) assembling the first of said pairs with the second of said pair of mold parts under vacuum.

27. A method of filling and assembly a pair of mold parts as claimed in claim 26 wherein said monomer or monomer mixture is degassed prior to filling said mold part.

28. A method of filling and assembling a pair of mold parts as claimed in claim 26 wherein said monomer or monomer mixture is dosed with a nozzle which is wicked by said predetermined dose at the completion of said filling step.

29. A method of filling and assembling a pair of mold parts as claimed in claim 26 wherein said first of said pair and said second of said pair of mold parts are alternated before said filling step.

30. A method of filling and assembling a pair of mold parts as claimed in claim 26 which further includes the step of coating a portion of the second of said mold parts with a surfactant to promote the preferential adhesion of any excess polymerizable monomer or monomer mixture to the first of said pair of mold parts.

31. A method of filling and assembling a pair of mold parts as claimed in claim 26 where said assembly step includes the step of lifting said first of said pair of mold parts and then advancing said second of said mold parts under said first part for assembly thereof.

32. A method of filling and assembling a pair of mold parts as claimed in claim 31 wherein said assembly step further includes the step of reciprocating said first of said mold parts upwardly prior to the positioning of said second of said mold parts, and then reciprocating said first of said pair of mold parts downwardly to seat said first part on said second part during assembly.

33. A method of filling and assembling a pair of mold parts as claimed in claim 32 wherein said downward reciprocation occurs at the rate of 2 to 7 mm per second.

34. A method of filling and assembling a pair of mold parts as claimed in claim 32 wherein said method further includes a step of clamping the pair of mold parts together to seat said first mold part on the second mold part and to displace excess monomer to form a HEMA ring between a first flange mounted on the first mold part and a second flange mounted on a second mold part.

35. A method of filling and assembling a pair of mold parts as claimed in claim 34 which further includes the step of clamping the pair of mold parts together with a reciprocating piston.

36. A method of filling and assembling a pair of mold parts as claimed in claim 29 wherein said alternating step includes a step of alternating pallets having one or more first mold parts with a pallet having one or more second mold parts and then routing said alternating pallets, in sequence, to be filled and assembled.

37. A method of filling and assembling a pair of mold parts as claimed in claim 36 wherein said first mold part is a back curve mold part for a contact lens and said second mold part is a front curve mold part for a contact lens.

38. A method of filling and assembling a pair of mold parts as claimed in claim 29 which further includes the step of transporting said mold parts on at least one pallet and then surrounding said mold parts with an enclosure formed by said pallets and a reciprocating housing, and then evacuating said enclosure to draw said vacuum.

39. A method of filling and assembling a pair of mold parts as claimed in claim 38 wherein said alternating step includes a step of alternating pallets having one or more first mold parts with a pallet having one or more second mold parts and then routing said alternating pallets, in sequence, to be filled and assembled.

40. A method of filling and assembling a pair of mold parts as claimed in claim 38 wherein said first and said second of said mold parts are initially transported on separate pallets which are conveyed under said enclosure.

41. A method of filling and assembling a pair of mold parts as claimed in claim 40 which further includes the step of clamping said mold parts together with a piston which reciprocates within said housing.

42. A method of filling and assembling a pair of mold parts as claimed in claim 41 which further includes the step of assembling and filling a plurality of pairs of mold parts in each filling and assembling sequence, said plurality of mold parts being transported on said pallets.

43. A method of filling and assembling a plurality of pairs of mold parts as claimed in claim 42 wherein said assembly step further includes the step of reciprocating a plurality of said clamping pistons and said first of said pair of mold parts upwardly prior to the positioning of said second of said mold parts, and then reciprocating said first of said mold parts downwardly to seat said first part on said second part for the assembly thereof.

* * * * *